United States Patent
Dalton et al.

(10) Patent No.: US 8,983,202 B2
(45) Date of Patent: Mar. 17, 2015

(54) SMILE DETECTION SYSTEMS AND METHODS

(75) Inventors: Dan L. Dalton, Greeley, CO (US); Daniel Bloom, Loveland, CO (US); David Staudacher, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 118 days.

(21) Appl. No.: 13/823,047

(22) PCT Filed: Sep. 13, 2010

(86) PCT No.: PCT/US2010/048678
§ 371 (c)(1), (2), (4) Date: Mar. 13, 2013

(87) PCT Pub. No.: WO2012/036669
PCT Pub. Date: Mar. 22, 2012

(65) Prior Publication Data
US 2013/0170755 A1   Jul. 4, 2013

(51) Int. Cl.
 *G06K 9/46* (2006.01)
 *G06K 9/00* (2006.01)

(52) U.S. Cl.
 CPC ........ *G06K 9/00302* (2013.01); *G06K 9/00308* (2013.01)
 USPC .......................................... 382/195; 382/118

(58) Field of Classification Search
 None
 See application file for complete search history.

(56) References Cited

U.S. PATENT DOCUMENTS

| | | | |
|---|---|---|---|
| 7,454,039 B2 * | 11/2008 | Tu et al. ................. | 382/115 |
| 7,643,659 B2 | 1/2010 | Cao et al. | |
| 8,660,361 B2 * | 2/2014 | Yu et al. ................. | 382/195 |
| 2005/0201594 A1 * | 9/2005 | Mori et al. .............. | 382/107 |
| 2008/0240571 A1 | 10/2008 | Tian et al. | |
| 2010/0026831 A1 | 2/2010 | Ciuc et al. | |
| 2011/0081089 A1 * | 4/2011 | Mori et al. .............. | 382/218 |
| 2012/0269428 A1 * | 10/2012 | Bloom et al. ............ | 382/164 |

FOREIGN PATENT DOCUMENTS

| | | |
|---|---|---|
| JP | 2005-056388 A | 3/2005 |
| JP | 2005-234686 A | 9/2005 |
| JP | 2009-253848 A | 10/2009 |
| WO | WO-2009/096987 A1 | 8/2009 |

OTHER PUBLICATIONS

Pantic, et al. (Facial Action Recognition for Facial Expression Analysis from Static Face Images pp. 1449-1461, IEEE, 2004.*
Schubert (EMOTIONFACE: Prototype Facial Expression Display of Emotion in Music), pp. 1-5, Proceeding of ICAD, 2004.*
(Continued)

*Primary Examiner* — Daniel Mariam
(74) *Attorney, Agent, or Firm* — Trenner Law Firm, LLC (57) ABSTRACT

Systems and methods of smile detection are disclosed. An exemplary method comprises generating a search map (400) for a subset of an image (300). The method also comprises identifying a plurality of candidates (400*a-f*) representing mouth corners. The method also comprises generating parabolas (410) between each pair of candidates representing mouth corners. The method also comprises analyzing contour of at least one of the parabolas to determine whether the mouth curves substantially upward to form a smile or curves substantially downward to form a frown.

20 Claims, 5 Drawing Sheets

(56) References Cited

OTHER PUBLICATIONS

Chiang, "A Novel Method for Detecting Lips, Eyes, and Faces in Real Time", < http://cgit.mutn.edu.tw:8080/cgit/PaperDL/KYC_100304035538.PDF > Publication Date: 2003; On pp. 277-287.

International Search Report and Written Opinion received in PCT Application No. PCT/US2010/048678, mailed Jun. 1, 2011, 8 pages.

Susan, Q, Y, Lin, "Investigation into Markerless Facial Expression Recognition Techniques", Bachelor of Science in Computer Science with Honours, The University of Bath, May 31, 2008.

* cited by examiner

SMILE DETECTION SYSTEMS AND METHODS

BACKGROUND

Object recognition in digital images is used for tracking faces (e.g., for security purposes) and medical imaging. Exemplary shape detection algorithms which may be used for object recognition include Active Appearance Model (AAM) and Active Shape Model (ASM).

The AAM algorithm matches a statistical model of object shapes provided during a training phase, with object shapes in a current image. During training, a set of images and corresponding coordinates for objects in the images is provided stored. Then during use, the algorithm compares the current image with the stored object recognition data. The least squares statistical technique is used to match objects in current image. However, ASM only uses shape constraints for object recognition and does not take advantage of other information such as the texture across the target object.

The ASM algorithm uses statistical models of the shape of objects which iteratively deform to fit to an example of the object in a new image. The shape of an object is represented by a set of points controlled by the shape model. The model is then matched to the current image by alternating between searching in the image around each point for a better position for that point, and updating the model parameters to best match to the new found positions. A better position for each point can be located by finding strong edges or matching to a statistical model of what is expected at the point.

However, the AAM and ASM algorithms are computationally intensive and therefore can be slow unless utilized on large computing systems such as those that might be used in conjunction with large video surveillance and medical imaging systems. The AAM and ASM algorithms have also been found to be error-prone.

DETAILED DESCRIPTION

Systems and methods described herein may be implemented for smile detection in an image. Briefly, smiles (or frowns) can be quickly detected using a less computationally intensive operation than the AAM and ASM algorithms described above. The smiles (or frowns) are detected by modeling the top and/or bottom lips as parabolas based on at least three input points: left corner, right corner, and midpoint. Other input points may also be used. Gray values are analyzed along the parabola path. The parabola(s) generally having wider, darker, and/or more consistent paths are selected as best representing the mouth. The curvature of the selected parabola can then be analyzed for smile (or frown).

In an exemplary embodiment, an image converter is configured to generate a search map for a subset of the image. An image analyzer operatively associated with the image converter is configured to: identify in the search map a plurality of candidates representing mouth corners; generate parabolas between one or more pair of the candidates; and determine based on the parabolic path whether the mouth curves substantially upward to form a smile or curves substantially downward to form a frown (or do not form either a smile or a frown).

Figure 1:
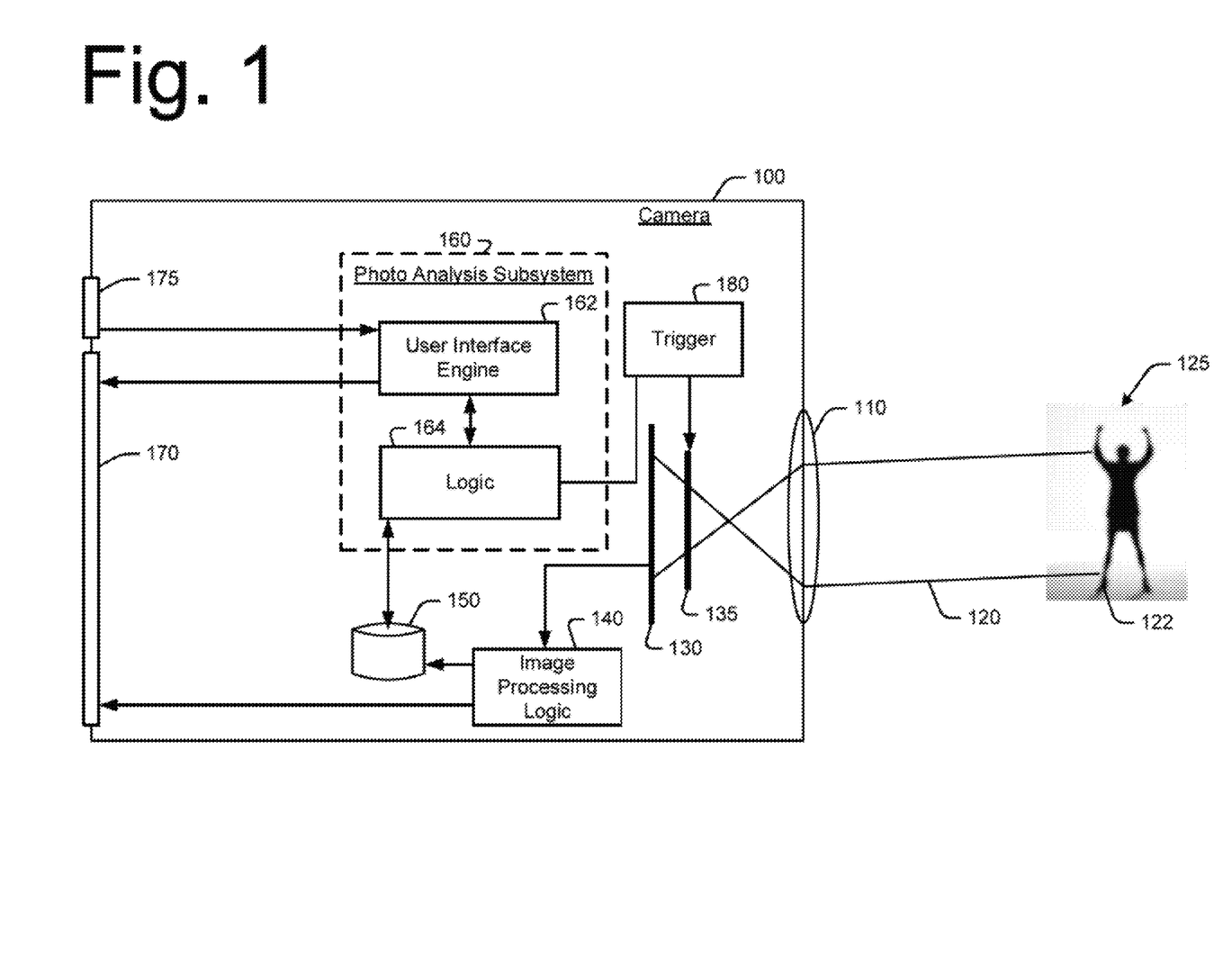
FIG. 1 is a block diagram of an exemplary camera system which may be used for smile detection in an image.

FIG. 1 is a block diagram of an exemplary camera system which may be used for smile detection in an image. The exemplary camera system 100 may be a digital camera (e.g., a still camera, a video camera, a camera phone, or otherwise) including a lens 110 positioned to focus light 120 reflected from one or more objects 122 in a scene 125 onto an image capture device or image sensor 130 when a shutter 135 is open for image exposure. The shutter 135 may be implemented mechanically or in circuitry, and is not implemented in all cameras. Exemplary lens 110 may be any suitable lens which focuses light 120 reflected from the scene 125 onto image sensor 130.

Exemplary image sensor 130 may include a plurality of photosensitive cells, each of which builds-up or accumulates an electrical charge in response to exposure to light. The accumulated electrical charge for any given pixel is proportional to the intensity and duration of the light exposure. Exemplary image sensor 130 may include, but is not limited to, a charge-coupled device (CCD), or a complementary metal oxide semiconductor (CMOS) sensor.

Camera system 100 may also include image processing logic 140. In digital cameras, the image processing logic 140 receives electrical signals from the image sensor 130 representative of the light 120 captured by the image sensor 130 during exposure to generate a digital image of the scene 125. The digital image may be stored in the camera's memory 150 (e.g., a removable memory card). In another embodiment, the digital image may be displayed for the user in "real-time" in what is often referred to as a "live-view," for example, on the display 170.

Shutters, image sensors, memory, and image processing logic, such as those illustrated in FIG. 1, are well-understood in the camera and photography arts. These components may be readily provided for digital camera 100 by those having ordinary skill in the art after becoming familiar with the teachings herein, and therefore further description is not necessary.

Digital camera 100 may also include a photo-analysis subsystem 160. In an exemplary embodiment, photo-analysis subsystem 160 is implemented in program code (e.g., firmware and/or software) residing in memory on the digital camera 100 and executable by a processor in the digital camera 100, such as the memory and processor typically provided with commercially available digital cameras.

A display 170, such as a liquid crystal display (LCD), may be provided for presenting the live-view and/or other user interaction. One or more camera controls 175 (e.g., arrow buttons and zoom levers) may also be provided to receive user input on the digital camera 100.

The photo-analysis subsystem 160 may include a user interface engine 162 and logic 164. Logic 164 may be operatively associated with the memory 150 for accessing digital images (e.g., reading the images stored in memory 150 and/or displayed in live-view by image processing logic 140). Logic 164 may include program code for analyzing the digital images (or a selected digital image) for smile detection in the image, such as application 200 described in more detail below with reference to FIG. 2. The logic 164 may also be operatively associated with the user interface engine 162 and/or with a shutter triggering mechanism 180.

In one embodiment, the logic 164 may notify a user of the camera when a smile is detected so that the user can operate the shutter triggering mechanism 180 to take a picture. In another embodiment, the logic 164 may notify a user of the camera when a frown is detected so that the user can instruct the subject 122 in the photo to smile. In another embodiment, the logic 164 may automatically take pictures by operating shutter triggering mechanism 180 when a smile is detected without the user having to provide any input to the camera. This may be particularly desirable, for example, when a user is shooting video and also wants to capture photos of people smiling without having to stop filming video to capture the photos.

Before continuing, it is noted that the digital camera 100 shown and described above with reference to FIG. 1 is merely exemplary of a camera system which may be implement for smile detection in an image. The systems and methods described herein, however, are not intended to be limited only to use with the camera system 100. Other embodiments of electronic image systems which may implement for smile detection in an image are also contemplated.

Figure 2:
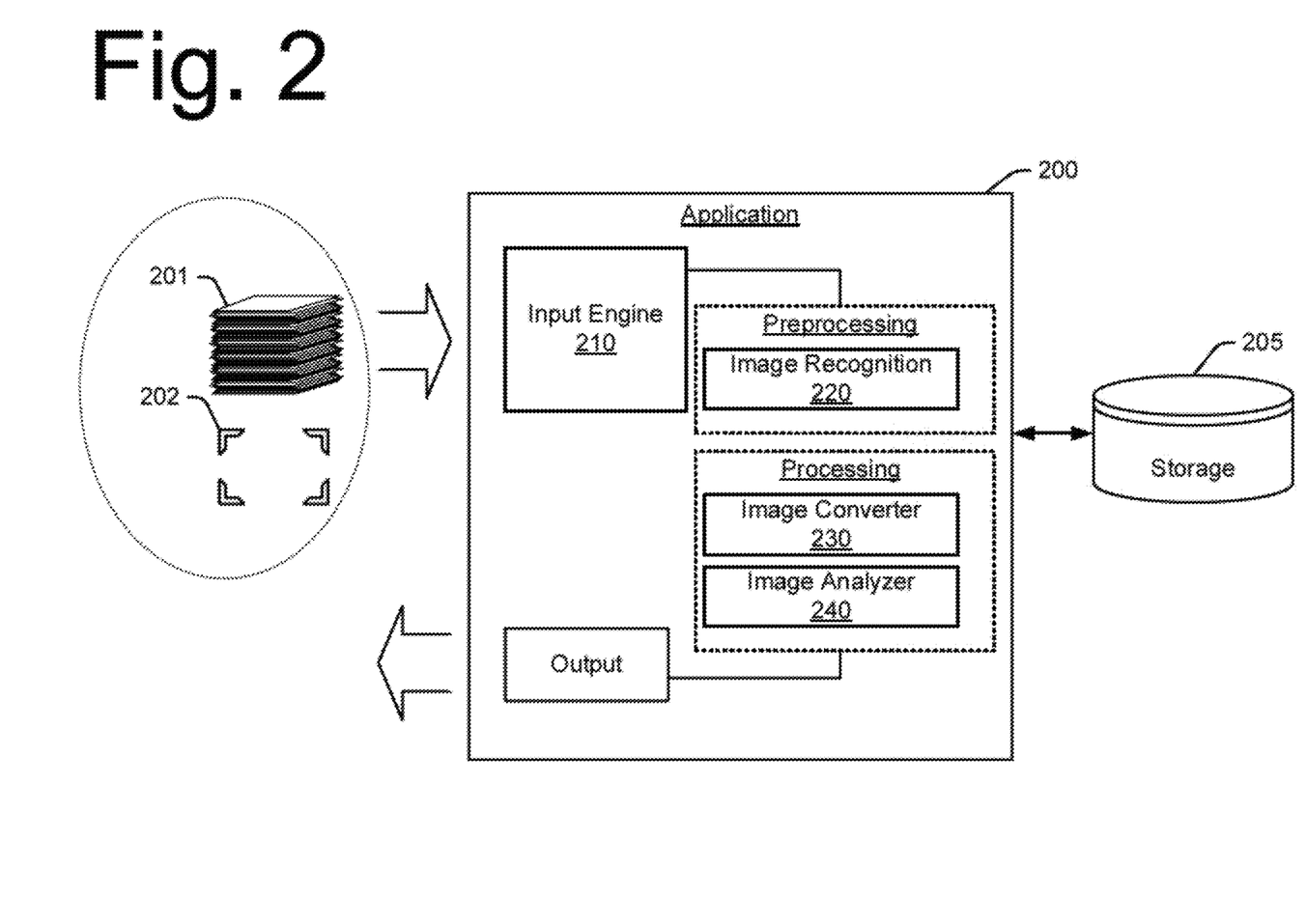
FIG. 2 is a schematic illustration of functional modules of an exemplary smile detection application.

FIG. 2 is a schematic illustration of functional modules of an exemplary image detection application 200 for smile detection. Exemplary application 200 may be implemented on the camera system (e.g., digital camera 100 in FIG. 1) in computer-readable program code executable by one or more computing systems, such as but not limited to, firmware, applications (e.g., the so-called mobile-based "app"), or other suitable software. For example, application 200 may be a mobile-based app executing on a smart phone, and executing the various functional modules described herein. Alternatively, the application 200 may be implemented in a stand-alone environment (e.g., as a software product for a personal computer).

Application 200 may be implemented as one or more functional modules, as illustrated in FIG. 2. It is noted, however, that the functional modules are not intended to be limiting. Other functional modules may be provided and/or functions of different modules may be combined into one or more different modules. Not all functions are shown in FIG. 2, but can be readily implemented in program code by one having ordinary skill in the art after becoming familiar with the teachings herein.

In an exemplary embodiment, application 200 may include an input engine 210 configured to receive one or more images 201, such as, "live-view" images. In live view, the image may include data residing in or read out from the image sensor substantially in real time. Alternatively, the image 201 may be received from memory in a suitable native electronic format (e.g., jpg, bmp, gif, pdf, or mpeg format). In any event, image 201 may include data representative of one or more person (e.g., a whole body image) or a portion of the person (e.g., one or more faces in the image).

It is noted that application 200 may also receive supplemental information from the user (e.g., metadata) or the camera system components (e.g. GPS, camera settings, light level detected in the scene). Regardless of how the image 201 is received, it is at least stored in a temporary computer-readable storage 205 to enable the operations described herein upon being accessed by the application 200. The image 201 may be stored for a predetermined duration, and/or purged after a predetermined time, e.g., to free storage.

Image processing may include one or more preprocessing operations, such as performing image recognition or face detection to identify pixels within a given image corresponding to a face of the subject in the image. For instance, if the image 201 includes other objects within the image data or is an image including the face and body of the subject, the face detection step locates the pixels within the image 201 corresponding only to the face. Preprocessing may also include locating pixels within the image data that corresponds to other object data, such as the eyes, nose or ears of the subject within the image.

In an embodiment, preprocessing may proceed using image recognition module 220 executing a face detection algorithm. For example, image recognition module 220 may apply image recognition technologies to the image 201 (or images being presented via live-view) and narrow the area of interest to one or more subset 202 of the image 201.

In an embodiment, image recognition module 220 identifies a face region in the image. The image recognition module 220 may be further utilized to identify one or more mouth search region. The face region and/or the mouth search region may be considered the subset 202 of the image 201. The mouth search region can be a fixed area relative to the face region. Or the mouth search region can be more precisely determined, e.g., based on the position of other facial features that may already be known in the face region (e.g., eyes, nose, chin).

It is noted that image recognition module 220 may be utilized to identify only the mouth search region, without having to first identify the face region. Alternatively, the face region may be qualified as the subset 202 utilized in the operations described herein, without separately identifying a mouth search region within the face region. In still other embodiments, the subset 202 may include the entire image (i.e., where image recognition 220 is not utilized).

In addition, implementing image recognition module 220 may be utilized in all cases or only in some instances. For example, actuating image recognition may depend at least in part on user desires. Other implementations will depend at least to some extent on design considerations, such as, e.g., desired performance (speed), and desire for identifying subsets 202 in which to perform the operations described herein (as opposed to analyzing the entire image).

It is noted that the image recognition module 220 may also be used to identify other facial features, location and distance information of the facial features (e.g., pixel coordinate data), feature size, feature alignment (e.g., facial features having similar distances, sizes, and relative locations when there are multiple faces in the image), and so forth. Exemplary facial features may include eyes, nose, mouth, ears, and the color, texture and contour of the face. For example, color and texture data may be used to distinguish teeth from the lips. Exemplary feature distances include distances between eyes, between a nose and mouth, width or length of the face, distance from one corner of the mouth to the other, distances from an eye to the upper lip, location of the bottom of the face, etc. Still other examples are also contemplated which will be readily apparent to those having ordinary skill in the art after becoming familiar with the teachings herein.

It is noted that some or all of the facial information from the image recognition module 220 can be obtained and stored prior to performing the operations described herein, e.g., to reduce processing time.

Other preprocessing can also include rotating the coordinate location of pixel values corresponding at least to the detected face so that the eyes are horizontally positioned with respect to each other, although this is not necessary in all instances. It is noted that in general, parabolic models of the lips match best when the eyes are horizontally aligned, and typically fail at +/−90 degree rotation. Preprocessing may also include scaling the size of the face (by increasing or decreasing image pixels) to a predefined relative facial size.

The subset(s) 202 which most closely identify the subjects face (or faces of multiple subjects) and/or mouth search region are provided to processing modules. Processing modules may include an image converter 230 and image analyzer 240 and may be utilized to perform the operations for smile detection in the subset(s) 202 (e.g., provided from preprocessing). The image converter 230 and image analyzer 240 may be operatively associated with a number of the different program code modules, as well as with the device hardware in order to carry out the operations described herein.

The image converter 230 is configured to generate a search map for a subset of the image. The image analyzer 240 is configured to identify in the search map a plurality of candidates representing mouth corners. The image analyzer 240 is also configured to generate parabolas between one or more pair of the candidates. For example, each pair of candidates is linked by a parabolic path to follow the contour of the lips (or other features that are believed to be the lips). Based on curvature of the parabolic path, the image analyzer 240 determines whether the mouth curves substantially upward to form a smile or curves substantially downward to form a frown. Operation of the image converter 230 and image analyzer 240 may be better understood with reference to FIGS. 3a-b and 4a-b, discussed in more detail below.

Before continuing, however, it is noted that the exemplary application 200 shown and described is for purposes of illustration and is not intended to be limiting. For example, the functional components shown in FIG. 2 do not need to be encapsulated as separate modules. In addition, other functional components (not shown) may also be provided and are not limited to those shown and described herein.

It is also noted that the application 200 may be executed "on the fly" during imaging operations (e.g., using live-view images). In such an embodiment, the camera device may be configured to automatically capture and record images when the subject smiles, based on output from the application 200. The actual number of images analyzed using the application 200 may vary and will depend on a number of design considerations, including processing requirements.

Figure 3A:
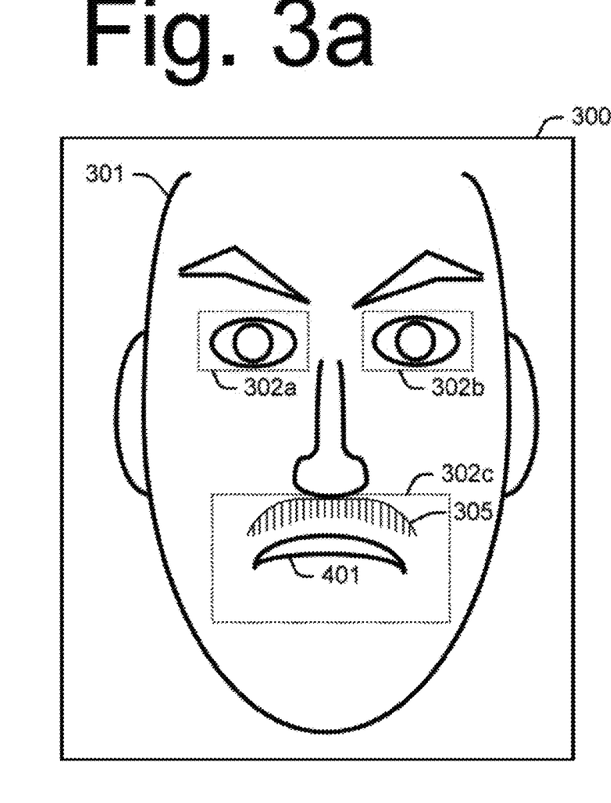
FIGS. 3a-b show exemplary images including a face which may be analyzed according to the systems and methods described herein for smile detection.
Figure 3B:
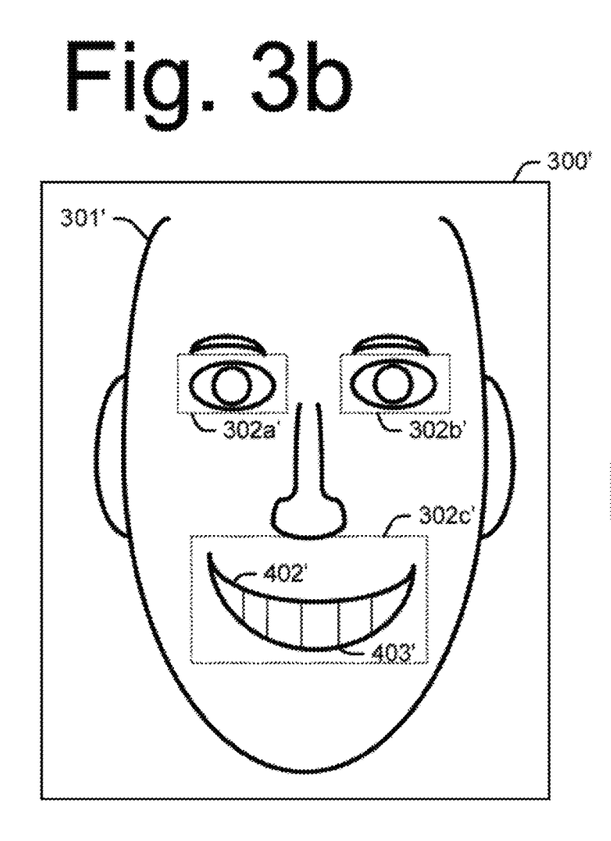

FIGS. 3a-b are images 300 including a face 301 which may be analyzed according to the systems and methods described herein for smile detection. It is noted that like reference numbers are used in both FIGS. 3a-b to correspond to similar features, with the prime (') symbol being used in FIG. 3b. Description of the corresponding features in each of the FIGS. 3a-b are not duplicated herein. FIG. 3a is presented as a line illustration of a man having a mustache 305 and frowning, and FIG. 3b is presented as an illustration of a woman smiling.

In this first example, image recognition may have already been executed to identify the face 301 in the image. That is, the image 300 may already be a portion of a larger image 300 that has been analyzed. Or for example, the image 300 may comprise the entire image (e.g., the entire image shown in live-view on a camera device and/or stored in memory).

Image recognition may be further executed to identify at least one subset of the image. In this example, three subsets are illustrated by the boxes 302a-c. The image recognition may further identify the subset identified by box 302c as being the subset of interest (i.e., the subset including the mouth region). This further identification may be accomplished using face recognition techniques based on, for example, identifying the relative location of eyes and the mouth region in the image 300. In any event, the subset 302c (and other subsets if applicable, such as for other faces in the image), may be used to generate a search map based on the subset 302c.

Figure 4A:
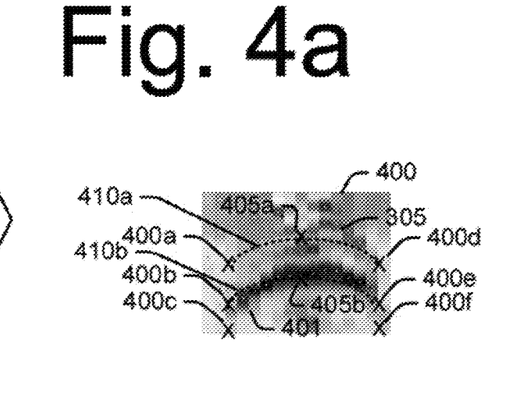
FIGS. 4a-b show exemplary search maps that may be generated for the images shown in FIGS. 3a-b, respectively.
Figure 4B:
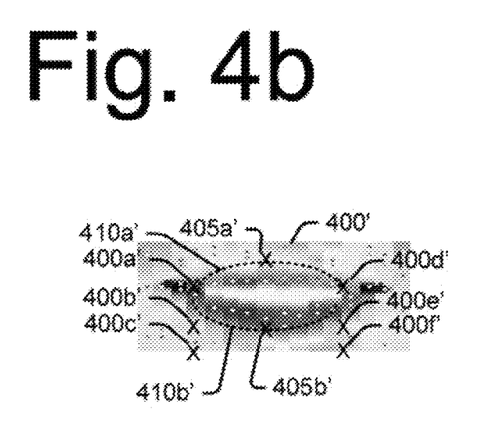

FIGS. 4a-b show exemplary search maps 400 that may be generated for the images shown in FIGS. 3a-b, respectively. Again, it is noted that like reference numbers are used in both FIGS. 4a-b to correspond to similar features, with the prime (') symbol being used in FIG. 4b. Description of the corresponding features in each of the FIGS. 4a-b are not duplicated herein. FIG. 4a is presented as an illustration of a bitmap that may be generated for the mustache 308 and frown shown in FIG. 3a, and FIG. 4b is presented as an illustration of a bitmap that may be generated for the smile shown in FIG. 3b.

In the embodiment shown in FIG. 4a-b, the search map 400 is a search bitmap corresponding to original image data in the mouth region indicated by box 302c in FIG. 3a-b, respectively. The bitmap may be generated in the YCbCr image space. Accordingly, the image may first be converted from a native RGB color space to the YCbCr image space. Although described herein for purposes of illustration as being a bitmap in the YCbCr image space, it is noted that other search maps and/or other color space may be utilized instead of or in addition to a bitmap in the YCbCr image space.

The bitmap may be generated by the image converter. Because the YCbCr color space is typically 24 bits, in this example the YCbCr color space may be converted to an 8 bit bitmap. In an embodiment, the luminance (Y) channel is normalized within the range of about a predetermined $Y_{min}$, (darkest) value up to about 255 units (lightest), which brightens and stretches the image. Midtones may also be lightened (e.g., by 50%) so that the darkest pixels remain darker than all other pixel values, as can be seen in FIGS. 4a-b.

Next, the blue and red chrominance channels are combined (e.g., by multiplying Cb×Cr). The result is inverted and normalized to be within the range of about a $CbCr_{min}$ value up to about 255 units. Midtones may also be darkened by 50% so that only the pixels with the greatest magenta content (e.g., the lips) remain darker than all other pixel values, as can be seen in FIGS. 4a-b.

In one example, the $Y_{min}$ value may be preselected as 50 units, and the $CbCr_{min}$ value may be selected as 85 units. Selecting these values results in a CbCr weighting of about three times (3×) and Y weighting of about five times (5×). However, other values may also be selected.

The normalized Y and CbCr are then combined (e.g., by multiplying these planes together), and shifted right 8 bits to maintain an 8-bit space. Accordingly, the relative weighting of each plane is:

$$Y\ weight = 255/Y_{min}$$

$$CbCr\ weight = 255/CbCr_{min}$$

It is noted that the bitmap may be down-sampled. In an embodiment the bitmap is down-sampled horizontally into 16 columns using averaging. Down-sampling may help to reduce the amount of data that needs analyzing in higher resolution bitmaps, while maintaining sufficient resolution to accurately identify the lip boundary.

It is also noted that a low-pass filter may be implemented. In an embodiment, a low-pass filter is applied in the vertical direction to reduce noise and smooth the bitmap. A high-pass filter may then be implemented to sharpen the bitmap in the vertical direction and enhance the lower-frequency edges (e.g., using a kernel at least two times (2×) taller than the low-pass filter).

After the search map 400 is generated, the image analyzer may identify candidate locations or points for the mouth corners (referred to herein as "candidates" 400a-c on the left side and 400d-f on the right side). In this example, the three darkest peak points (because mouth corners tend to be relatively dark in the bitmap) are selected from each column in the outer portion of the bitmap (e.g., the outer 25-40% of columns) on both the left and right side of the bitmap.

A threshold such as a minimum vertical spacing may be imposed between the points in the bitmap when selecting candidates. Such a threshold may help ensure that the selected candidates are not clustered too closely together.

A score may be assigned to the candidates. The score may a weighted sum of the score of individual candidates or groups of candidates. The candidate pair or pairs having the greatest score may be selected for fitting parabolas. Based on the scores in this example, candidates 400a-b were selected on the left side and are paired with candidates 400d-e on the right side. It is also noted that other methods to identify candidates may also be employed and are not limited to the description above.

The image analyzer may then identify a midpoint 405a-b for each pair of left and right candidates selected based on their score. In an embodiment, the image analyzer locates the vertical line segment that begins at the top of the search region and ends at the bottom of the search region and which is positioned midway horizontally between the candidate pairs. Next, starting at the top of the line and continuing to the bottom points may be selected at regular intervals to generate a parabolic path 410a, 410b from the left corner through the midpoint to the right corner.

Where there is more than one parabola, the parabolas 410a-b may be scored. In an embodiment, a score may be assigned to the parabolas 410a-b based on the darkness, width, and/or uniformity of the image pixels in the parabolic path. The score may be saved, for example, in an array along with corresponding scores for the other parabolas. The highest parabola scores generally correspond to the combined top and bottom lips 401, top lip (405a' in FIG. 4b), bottom lip (405b' in FIG. 4b), or possibly a gap between the teeth. The lowest scores generally correspond to teeth (seen between the lips in FIG. 4b), or skin or facial feature other than the lips.

In an embodiment, the score for a parabolic path may be assigned as follows. First, all gray values (one per column) are inverted (subtracted from 255) then summed along the parabolic path. Inverted values of about 0 are least likely candidates, and inverted values larger than zero and approaching 255 are more likely to be lips. Next, half of the delta is subtracted between each adjacent pairs of gray values. This results in a lower score and 'penalizes' parabolic paths with inconsistent gray values. Then the final score is squared and then divided by the width of the parabola. This example gives higher weight to scores for wider parabolas. It is noted that the +/− sign should be preserved, as will become apparent below.

A composite open-lip score for the corner candidate pair may now be determined. The highest scoring parabola (e.g., 410b' in FIG. 4b) is assumed to be the first lip. It is further assumed that there will be at least one lower scoring (light) parabola (not shown) between the lips corresponding to teeth. To find the parabola corresponding to the second lip (e.g., 410a' in FIG. 4b) a composite score is determined for each parabola by adding its score to the score for the first lip and then subtracting the lowest scoring parabola (teeth) between the two parabolas. The highest composite score is the open-lip score.

A threshold may be employed to determine if the mouth is open or closed. In an embodiment, the second lip score minus the teeth score is the relative darkness of the second lip, which is compared to the predetermined threshold (e.g., 30% of the first lip score).

In the case of closed lips (as illustrated by the image in FIG. 3a), the best composite score of all corner candidates is substantially equal to the peak parabola score. In this case even though there are two parabolas that appear to be a good fit (e.g., 410a in FIG. 4a corresponding to the mustache 305 in FIG. 3a), the composite score does not meet the threshold, indicating that the mouth is closed. If the mouth is closed then the composite score, is thrown out, and candidates with the highest scoring single peak are selected as the only parabola corresponding to the darkest line (smile or frown) between the closed lips.

If the composite score exceeds the threshold then the teeth are showing and the mouth is open. In the case of an open mouth (as illustrated by the image in FIG. 3b), the shape of the selected parabolas appears to be shaped as a "football" or a "slice of melon." To further confirm that the teeth parabola is crossing teeth, the parabolic path may be further analyzed in the original Y bitmap to see if dark vertical lines between the teeth can be detected.

In any event (i.e., whether the mouth is open or closed), the parabolas can be defined using the three points (i.e., the left candidate, the right candidate, and the midpoint) according to the following equation:

$$y=Ax^2+Bx+C \quad \text{(EQN 1)}$$

In Equation 1, the parameter "A" indicates the degree to which the parabola curves up or down. A negative value for "A" indicates that the parabola curves upward (e.g., to form a smile). A positive value for "A" indicates that the parabola curves downward (e.g., to form a frown).

It is noted that the examples discussed above are only for purposes of illustration and not intended to be limiting. Other operations and variations on the processes described above, which are now known or later developed, may also be implemented, as will be readily appreciated by those having ordinary skill in the art after becoming familiar with the teachings herein.

The exemplary systems discussed above are provided for purposes of illustration. Still other implementations are also contemplated. For example, the systems described herein may also enable smile detection for multiple faces in a single image. As another example, metadata may be associated with the image prior to being stored. The metadata may identify images based on number of smiles and/or degree of smile. Accordingly, the metadata enables the image to be quickly located and displayed for the user based on various search criteria.

Figure 5:
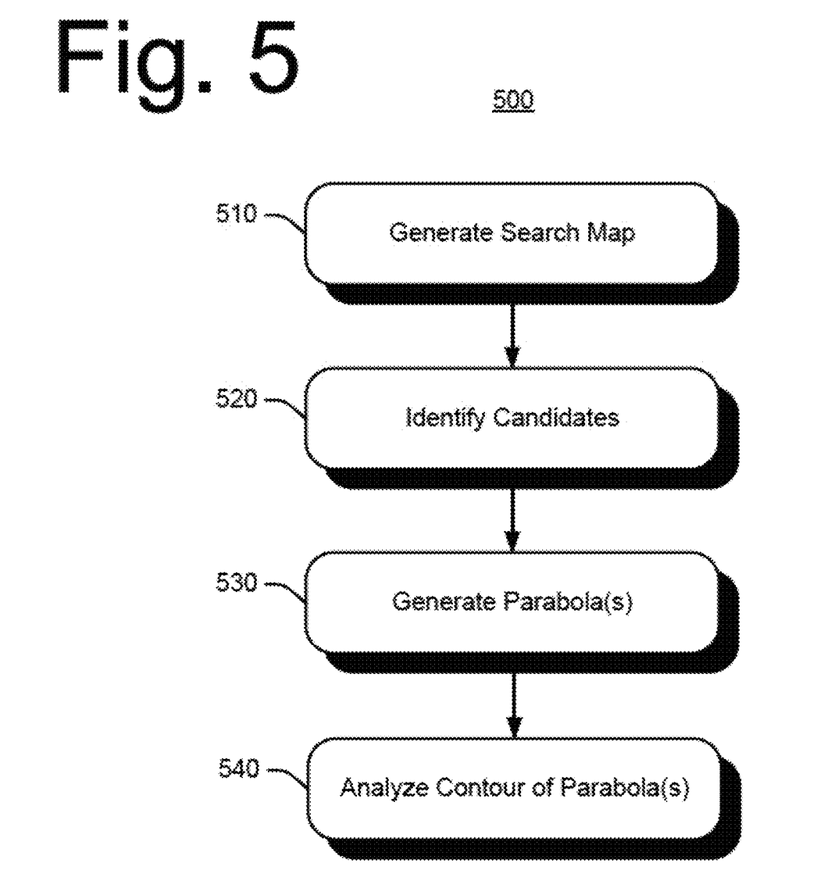
FIG. 5 is a flowchart illustrating exemplary operations for smile detection in an image.

FIG. 5 is a flowchart illustrating exemplary operations for smile detection in an image. Operations 500 may be embodied as logic instructions on one or more computer-readable medium. When executed on a processor, the logic instructions cause a general purpose computing device to be programmed as a special-purpose machine that implements the described operations. In an exemplary implementation, the components and connections depicted in the figures may be used.

In operation 510, a search map is generated for a subset of an image. In operation 520, a plurality of candidates representing mouth corners are identified. In operation 530, one or more parabola is generated between each pair of candidates representing mouth corners. In operation 540, contour of at least one of the parabolas is analyzed to determine whether the mouth curves substantially upward to form a smile or curves substantially downward to form a frown.

The operations shown and described herein are provided to illustrate exemplary implementations of a smile detection method. It is noted that the operations are not limited to the ordering shown. Still other operations may also be implemented.

By way of illustration, the method may also include first, using image recognition to identify a face region, and then selecting the subset of the image from the face region.

By way of further illustration, the method may also include scoring each parabola. The parabola best representing the mouth is then selected based on the score.

Also by way of example, and as described in more detail above, the method may also include generating the search map may include normalizing a luminance channel in the subset of the image and combining chrominance channels in the subset of the image. Then the normalized luminance channel is combined with the combined chrominance channels, as described in more detail above.

The method may also include down-sampling the search map to reduce the data for analysis while maintaining resolution to identify the plurality of candidates representing mouth corners. The method may also include filtering the search map to reduce noise and smooth the data to analyze. The method may also include sharpening the search map to enhance lower frequency edges.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

The invention claimed is:

1. A method of smile detection in an electronic image device, comprising:
   generating a search map for a subset of an image, the search map generated as a bitmap of original image data in the image;
   identifying a plurality of candidates representing mouth corners;
   generating parabolas between each pair of candidates representing mouth corners; and
   analyzing contour of at least one of the parabolas to determine whether the mouth curves substantially upward to form a smile or curves substantially downward to form a frown.

2. The method of claim 1 further comprising:
   using image recognition to identify a face region; and
   selecting the subset of the image from the face region.

3. The method of claim 1 further comprising scoring each parabola.

4. The method of claim 3 further comprising selecting a parabola best representing the mouth based on the score, before analyzing at least one of the parabolas.

5. The method of claim 1 wherein generating the search map includes:
   normalizing a luminance channel in the subset of the image;
   combining chrominance channels in the subset of the image; and
   combining the normalized luminance channel with the combined chrominance channels.

6. The method of claim 5 further comprising down-sampling the search map to reduce the data to analyze while maintaining resolution to identify the plurality of candidates representing mouth corners.

7. The method of claim 5 further comprising filtering the search map to reduce noise and smooth the data to analyze.

8. The method of claim 5 further comprising sharpening the search map to enhance lower frequency edges.

9. A system for smile detection, comprising:
   a computer-readable storage for storing an image;
   an image converter operatively associated with the computer-readable storage, the image converter configured to generate a search map for a subset of the image, the search map generated as a bitmap of original image data in the image;
   an image analyzer operatively associated with the image converter, the image analyzer configured to:
      identify in the search map a plurality of candidates representing mouth corners;
      generate parabolas between one or more pair of the candidates; and
      determine based on a path of the parabolas whether the mouth curves substantially upward to form a smile or curves substantially downward to form a frown.

10. The system of claim 9 further comprising:
   a scoring module operatively associated with the image analyzer, the scoring module scoring parabolas based on at least one of: darkness, width, and uniformity of image pixels; and
   wherein the parabola best representing the mouth is based on the score.

11. The system of claim 9 wherein the image analyzer is further configured to determine whether the mouth is open or closed.

12. The system of claim 9 wherein the image analyzer is further configured to identify the plurality of candidates representing mouth corners by finding peak points in each outer column of the search map.

13. The system of claim 9 wherein the image analyzer is further configured to generate the search map by:
   normalizing a luminance channel in a subset of the image;
   combining chrominance channels in the subset of the image; and
   combining the normalized luminance channel with the combined chrominance channels.

14. The system of claim 13 further comprising down-sampling the search map to reduce the data to analyze while maintaining resolution to identify the plurality of candidates representing mouth corners.

15. The system of claim 13 further comprising filtering the search map to reduce noise and smooth the data to analyze.

16. The system of claim 13 further comprising sharpening the search map to enhance lower frequency edges.

17. An electronic image analyzer, comprising computer readable program code stored on a non-transitory computer readable storage medium and executable by a processor to:
   generate a search map as a bitmap of original image data in an image;
   identify in the search map for a subset of the image, a plurality of candidates representing mouth corners;
   generate parabolas between pairs of the candidates representing mouth corners; and
   determine whether the mouth curves substantially upward to form a smile or curves substantially downward to form a frown.

18. The image analyzer of claim 17 wherein the computer readable program code is further executable to identify a lip boundary, 19. The image analyzer of claim 17 wherein the computer readable program code is further executable to identify teeth.

20. The image analyzer of claim 17 wherein the computer readable program code is further executable to:
   normalize a luminance channel in the subset of the image;

combine chrominance channels in the subset of the image; and combine the normalized luminance channel with the combined chrominance channels.

* * * * *

UNITED STATES PATENT AND TRADEMARK OFFICE
CERTIFICATE OF CORRECTION

| | | |
|---|---|---|
| PATENT NO. | : 8,983,202 B2 | Page 1 of 1 |
| APPLICATION NO. | : 13/823047 | |
| DATED | : March 17, 2015 | |
| INVENTOR(S) | : Dan L. Dalton et al. | |

It is certified that error appears in the above-identified patent and that said Letters Patent is hereby corrected as shown below:

In the Claims

In column 10, line 62, in Claim 18, delete "boundary," and insert -- boundary. --, therefor.

Signed and Sealed this
First Day of September, 2015

Michelle K. Lee
*Director of the United States Patent and Trademark Office*